(12) United States Patent
Gordon et al.

(10) Patent No.: US 11,512,994 B2
(45) Date of Patent: Nov. 29, 2022

(54) VEHICLE FUEL VOLUME CONSUMPTION ESTIMATION AND ACCURACY ANALYSIS SYSTEMS AND METHODS

(71) Applicant: Ford Global Technologies, LLC, Dearborn, MI (US)

(72) Inventors: Richard Gordon, Canton, MI (US); Ben Bulat, Northville, MI (US); Shantanu Deshmukh, Dearborn, MI (US); Hyongju Park, Ann Arbor, MI (US); Arnold Babila, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

(21) Appl. No.: 17/037,901

(22) Filed: Sep. 30, 2020

(65) Prior Publication Data
US 2022/0099474 A1    Mar. 31, 2022

(51) Int. Cl.
| | |
|---|---|
| G01F 25/00 | (2022.01) |
| G01F 23/00 | (2022.01) |
| G01F 11/00 | (2006.01) |
| B60K 15/03 | (2006.01) |
| G01F 22/00 | (2006.01) |

(52) U.S. Cl.
CPC .............. G01F 23/00 (2013.01); B60K 15/03 (2013.01); G01F 22/00 (2013.01); *B60K 2015/03217* (2013.01)

(58) Field of Classification Search
CPC .......... G01F 23/00; G01F 22/00; B60K 15/03
See application file for complete search history.

(56) References Cited

U.S. PATENT DOCUMENTS 6,594,579 B1 *   7/2003   Lowrey .................... G08G 1/20
                                                            340/439
7,206,720 B2     4/2007   LaPant
(Continued)

FOREIGN PATENT DOCUMENTS

| DE | 102009007532 A1 | 8/2010 |
|---|---|---|
| JP | 2011141161 A | 7/2011 |

OTHER PUBLICATIONS

Eskilsson et al., "Fuel Level Estimation Methods—Master's thesis in Systems, Control and Mechatronics", Department of Electrical Engineering, Chalmers University of Technology, Gothenburg, Sweden 2018 (67 pages).

*Primary Examiner* — Long T Tran
(74) *Attorney, Agent, or Firm* — Brandon Hicks; Eversheds Sutherland (US) LLP

(57) ABSTRACT

Vehicle fuel volume consumption estimation and accuracy analysis systems and methods are provided herein. An example method includes determining a fuel level percentage estimate or a fuel volume estimate for a vehicle at a first point in time and a second point in time for a trip, the fuel level percentage estimate or the fuel volume estimate being determined using a fuel tank model of a fuel tank of a vehicle, determining connected vehicle data that includes a determination of accumulated fuel consumed during the trip, and determining an accuracy of fuel tank model using the fuel level percentage estimate or the fuel volume estimate calculated at the first point in time and the second point in time, as well as the accumulated fuel consumed during the trip.

20 Claims, 9 Drawing Sheets

(56) References Cited

U.S. PATENT DOCUMENTS

| | | | |
|---|---|---|---|
| 8,984,934 B2 | 3/2015 | Sweppy et al. | |
| 9,528,872 B2 | 12/2016 | Stevenson et al. | |
| 9,576,291 B2 | 2/2017 | Lamb et al. | |
| 9,919,664 B2 | 3/2018 | Vucelic et al. | |
| 10,140,785 B1 * | 11/2018 | Cox | G01F 9/023 |
| 10,163,141 B2 | 12/2018 | Fansler et al. | |
| 2009/0056436 A1 * | 3/2009 | Miceli | G01F 9/008 |
| | | | 73/290 R |
| 2016/0071333 A1 * | 3/2016 | Haidar | G07C 5/008 |
| | | | 701/29.3 |
| 2018/0012204 A1 * | 1/2018 | Shetty | G07F 13/025 |
| 2018/0045527 A1 * | 2/2018 | Baker | G01C 21/3484 |
| 2019/0376826 A1 * | 12/2019 | Thomas | G01F 23/24 |

* cited by examiner

VEHICLE FUEL VOLUME CONSUMPTION ESTIMATION AND ACCURACY ANALYSIS SYSTEMS AND METHODS

FIELD

The present disclosure is generally directed to systems and methods that determine a fuel volume based on empirical data, which can include fuel tank modeling and vehicle identification number analyses.

BACKGROUND

While automobiles comprise multiple ways to communicate fuel-related information, such as distance to empty, fuel economy, fuel level via a gauge, and so forth, there are certain types of customers and applications that require more precise information.

Distance to Empty (DTE) calculations provide predicted distance that the vehicle can travel before the tank is empty, but these calculations may have some margin designed therein to protect the customer from running out of gas and may not communicate the actual volume of fuel in the tank.

Fuel economy estimates are helpful to assess how efficiently the user is driving, but do not generally indicate a specific fuel volume. The fuel level gauge provides an indication of the fuel level, but the gauge does not always change at a constant rate. That is, the gauge may not change much when fuel is used with a full tank, but the gauge may change quickly if the tank is partially full. This can be the result of complex fuel tank geometries and the inability of the fuel sensor to detect changes at certain areas of the fuel tank. The result is a gauge that provides a subjective estimate of how full the fuel tank is and not an absolute fuel volume.

Certain businesses, such as rental companies, need to know the level of fuel in their vehicles to a high level of accuracy. Certain methods use connected vehicle data to transform a fuel level percentage to a fuel volume based on experimental measurements on a sampling of vehicles. When this transformation is applied to thousands of vehicles over an extended period of time, however, it becomes challenging to assess the accuracy. Ensuring that estimates are accurate over a large population without measuring individual vehicles may not be feasible from a resource and cost perspective. Furthermore, factors, such as temperature and material expansion that were not present in the original measurements, may affect the estimation in mass deployment.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
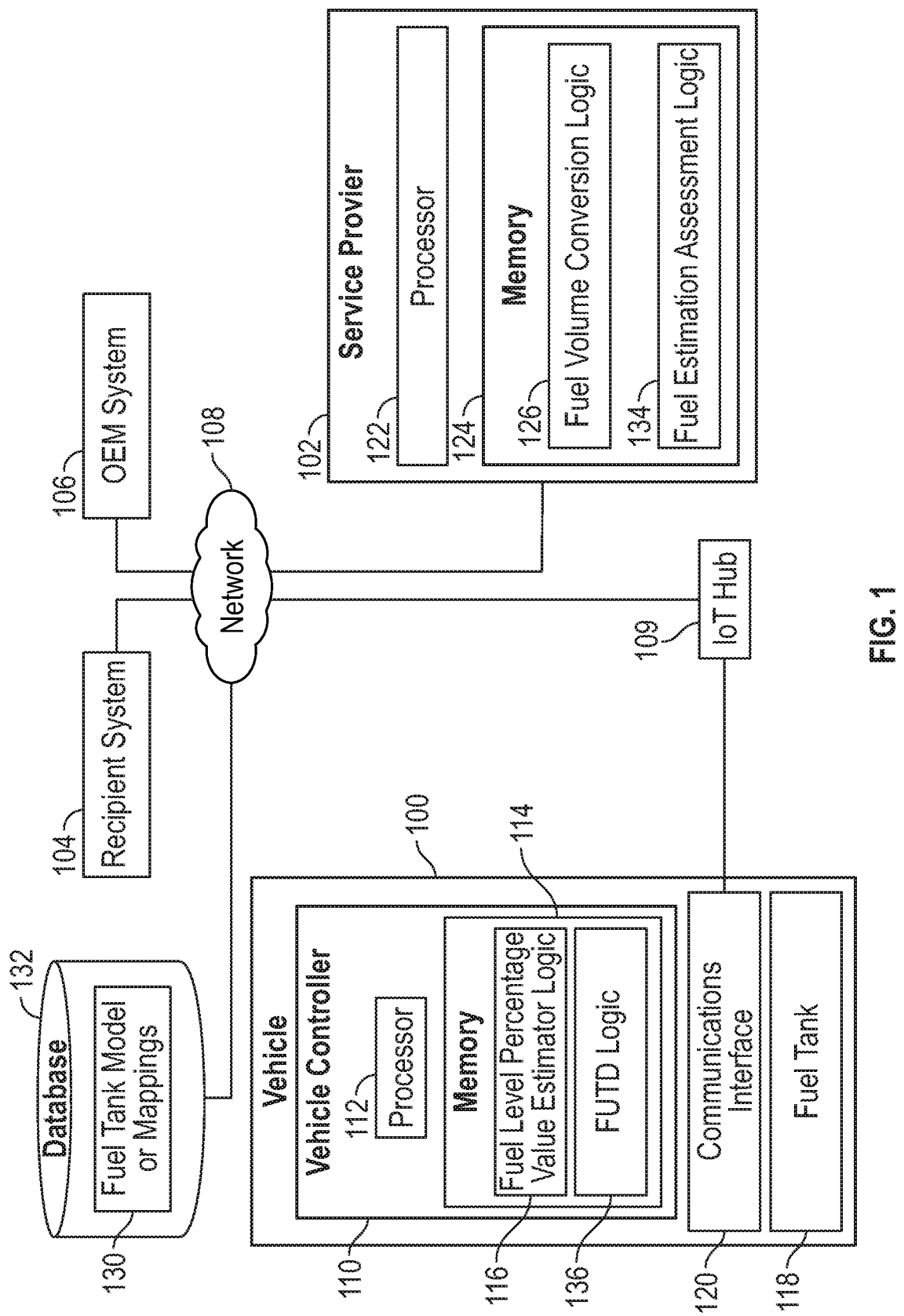
FIG. 1 depicts an illustrative architecture in which techniques and structures for providing the systems and methods disclosed herein may be implemented.

Systems and methods disclosed herein are configured to calculate fuel volume estimates from fuel volume percentages calculated by a vehicle controller. Additionally, the accuracy of these fuel volume estimations can involve modeling of fuel tanks by part number.

Accurate and real-time fuel volume calculations for vehicles are disclosed herein. Some vehicles are configured to determine a fuel level percentage value that is a gross estimate of a current fuel level remaining in a fuel tank of a vehicle. While these fuel level percentage values have some explanatory significance, they generally lack specificity and accuracy. These discrepancies can be due to variations in vehicle equipment, on a per model basis, in some instances. For example, the geometry of a fuel tank in a particular vehicle model may influence how fuel level percentage values compare to a vehicle of the same model, but with a different fuel tank geometry. These differences in vehicle equipment may lead to discrepancies in fuel level percentage value calculation. That is, fuel level percentage value estimator logic implemented in the vehicle may not account for these geometrical differences and may treat these two vehicles identically when calculating fuel level percentage values for each. Moreover, fuel level percentage values may not be a preferred format for some users as users are more accustomed to understanding fuel levels in terms of gallons or liters, which can further be interpreted by the user as an available distance that the vehicle can travel before needing to be refilled. For example, a fuel level percentage value of 15% may generally indicate that the user should refill soon, it is not as informative as knowing that the vehicle has 3.5 gallons of fuel, and that the vehicle has a fuel efficiency of 25 miles per gallon of fuel. Thus, converting the level percentage values to fuel volume values can be advantageous for the end user and more informative than a fuel level percentage value.

The systems and methods herein can be configured to use specific vehicle equipment data to accurately convert fuel level percentage values to fuel volume values. For example, the systems and methods can determine a fuel level percentage value for a vehicle from fuel level percentage value estimator logic of the vehicle, as well as determine a vehicle identification number (VIN) of the vehicle. The VIN is used to determine fuel tank part number for the specific VIN and select a fuel tank model. The fuel level percentage value can be converted into a fuel volume value based on the fuel tank model as identified by the fuel tank part number. A message can be transmitted to a recipient that includes the fuel volume value.

A fuel tank model can be created to correlate fuel level percentage values to fuel volume values which account for specific fuel tank geometries. Known amounts of fuel volume can be added to a fuel tank and correlating measurements of fuel level percentage values are determined to establish a fuel tank model. Other mappings can be created to correlate VIN numbers with fuel tank part numbers, fuel tank part numbers with fuel tank models, and so forth.

The systems and methods disclosed herein use connected vehicle data, such as fuel consumed, as a standard to compare a fuel volume estimation. Fuel consumed, by itself, cannot be used to estimate the fuel level because it is a relative value. For example, one gallon of fuel was used in a trip, but this does not identify the fuel volume remaining in the fuel tank. For example, 15.3 gallons may remain in the tank.

Fuel consumed is a reliable piece of fuel-related information available on the vehicle. Fuel consumed can be utilized as a gauge to compare a fuel level estimate on a trip-by-trip basis. Some embodiments include evaluating parameters of a trip, defined by an ignition on and ignition off event. A difference between a fuel volume estimate at the start and end of the trip could be compared to the fuel consumed for the trip. The estimate should match what was observed (the fuel consumed) within a specific tolerance level. The tolerance level may be a product of the uncertainty of the fuel level estimate and the accuracy of the fuel consumed. If the fuel volume estimate for the trip falls within this tolerance, then the estimate is considered accurate. If it falls outside of the tolerance, then the accuracy is in question and needs further investigation. Analyzing the accuracy over different factors (vehicles, time, weather, age, and so forth) can be used to determine if performance is stable or changing and whether adjustments to the fuel level estimate model are needed.

To ensure the data for the comparison was reliable, quality thresholds are established for connected vehicle data used for the comparison analysis. The quality thresholds include ensuring the fuel level percentage is in a valid range, the fuel tank was not filled up, the fuel economy estimate was within a reasonable range, the trip records were complete (an ignition on was paired with an ignition off), and the odometer data was monotonic.

Once the data is qualified, a specific range of fuel consumed can be targeted for use as the gauge so as to provide a focused area for comparison, maximize the amount of data available, and minimize the uncertainty associated with fuel consumed. For example, a range of fuel consumed from 0.5 to 1.5 gallons can be used. Using a higher range would require longer trips, which would limit the sample size and could introduce new sources of variation, such as accumulated error. The systems and methods disclosed herein can be created dashboard with key performance indicators to visualize the data and communicate the accuracy across multiple factors.

The systems and methods herein are generally used to compare estimates to a vehicle specific standard and assess the results of hundreds of millions of records over a prolonged period of time to evaluate accuracy over time. The systems and methods use one or more algorithms to perform quality checks on the data, define a standard, distribute the processing among multiple computer resources, and define acceptable thresholds.

Illustrative Embodiments

Turning now to the drawings, FIG. 1 depicts an illustrative architecture in which techniques and structures of the present disclosure may be implemented. A vehicle 100, a service provider 102, a recipient system 104, and an OEM (original equipment manufacturer) system 106 can be communicatively coupled through a network 108. The network 108 can include any public or private network such as Wi-Fi, cellular, or other long-range and/or short-range wireless network(s) or protocols. Each component of the architecture is configured to access the network 108 using any means that would be known to one of ordinary skill in the art.

The network 108 can include an IoT (Internet-of-Things) hub 109 that receives data from the vehicle 100 and forwards the data to the service provider 102. The recipient system 104 can query the service provider 102 of a real-time fuel volume value for the vehicle 100 over a secure application programming interface (API).

It will be understood that some aspects of the present disclosure may be performed at the vehicle level, the service provider level, and/or cooperatively vehicle level and the service provider level. In general, the vehicle 100 may have a vehicle controller 110 that can comprise a processor 112 and memory 114. The memory 114 stores instructions, such as implement fuel level percentage value estimator logic 116 that can be executed by the processor 112 to perform aspects of fuel level percentage value estimation. When referring to operations executed by the vehicle controller 110 it will be understood that this includes the execution of instructions by the processor 112. The vehicle controller 110 can utilize the fuel level percentage value estimator logic 116 to calculate a fuel level percentage of a fuel tank 118 in real-time. A fuel level percentage value can be displayed on a human machine interface of the vehicle 100 and/or can be transmitted to the service provider 102 for conversion into a fuel volume value. The vehicle 100 can also comprise a communications interface 120 to access the network 108.

The vehicle controller 110 can transmit a fuel level percentage value and a VIN number of the vehicle 100 to the service provider 102. The service provider 102 can use these values to convert the fuel level percentage value into a fuel volume value and provide the same to the recipient system 104.

In more detail, the service provider 102 can comprise a processor 122 and memory 124. The memory 124 stores instructions, such as implement fuel volume conversion logic 126 that can be executed by the processor 122 to perform aspects of fuel level percentage value to fuel volume conversion. When referring to operations executed by the service provider 102 it will be understood that this includes the execution of instructions by the processor 122. To be sure, the service provider 102 can be implemented as a physical or virtual server, or as an instance in a cloud environment.

Figure 2:
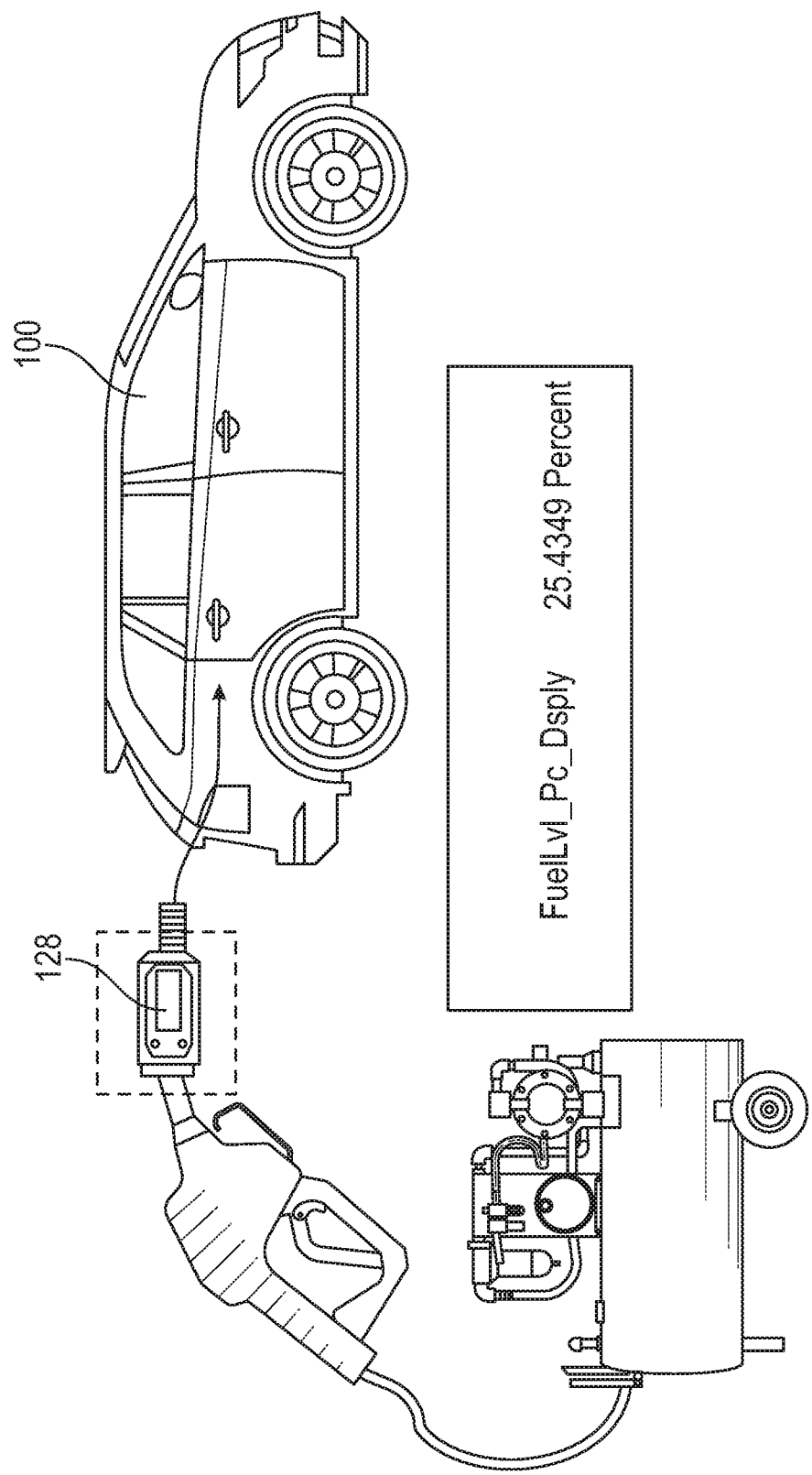
FIG. 2 schematically illustrates a process for creating a fuel tank model of a fuel tank of a vehicle.

Prior to providing fuel level percentage value to fuel volume conversion services, various mappings can be created and maintained by the service provider 102. Some mappings initially rely on fuel tank modeling processes. As noted generally above, fuel tank modeling can include a controlled process, as illustrated in FIG. 2, where a known volume of fuel is introduced into the fuel tank of the vehicle 100. As known volumes of fuel are introduced, a fuel level percentage value is obtained from the vehicle controller 110. The known volume of fuel can be determined using a filling gauge 128. A mapping or correlation can be created using this process where fuel level percentage values are mapped to fuel volume values. To be sure, this process can use a nonlinear model that can capture irregular shapes for each fuel tank application. That is, a specific fuel tank model can be established for each specific fuel tank part number. In some instances, the VIN can be used to obtain specific fuel tank parameters or other fuel system parameters that affect fuel storage of the fuel tank 118. These fuel tank parameters, such as geometry, can be used in the fuel tank modeling process.

Figure 3:
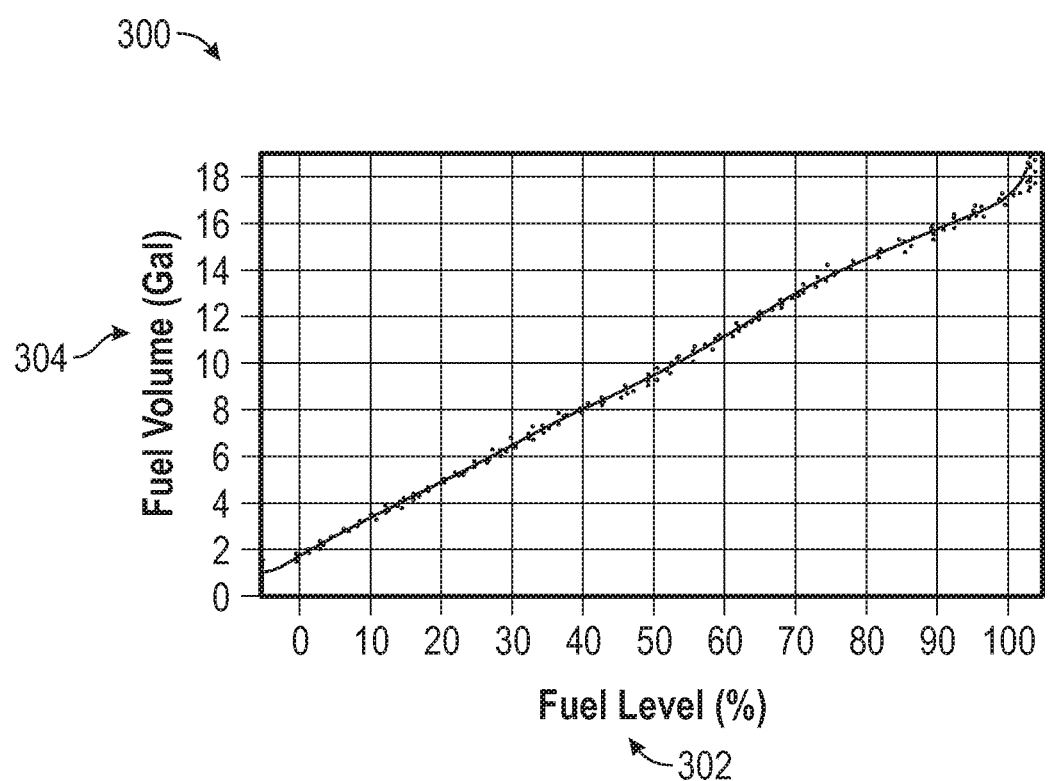
FIG. 3 is a graphical view of a fuel tank model of a fuel tank of a vehicle.

As noted above, each fuel tank can have a unique geometry and the geometry may affect calculations of fuel level percentage values. Empirical modeling of fuel tanks to correlate fuel level percentage values and fuel volume values can be used to reduce errors from this type of geometric variability. An example plot graph 300 is illustrated in FIG. 3, where fuel level percentage values 302 are correlated to fuel volume values 304.

The service provider 102 can maintain various fuel tank model or mappings 130 in a database 132. The service provider 102 can also maintain VIN to fuel tank part mappings the database 132. As discussed below, the VIN to fuel tank part number mappings can also be obtained from the OEM system 106 (or an equivalent information source).

Again, in an example use case, a particular model of vehicle, such as a Ford™ F-150 may have several levels of equipment options. Not all Ford™ F-150s have the same size or shape of fuel tank. Thus, errors in fuel level percentage values are introduced when a one-size-fits-all approach is taken. Specific fuel tank part numbers for the fuel tank equipment can be assessed using a vehicle identification number (VIN) for the vehicle 100.

In general, the service provider 102 receives the VIN and fuel level percentage value from the vehicle controller 110. Using the VIN, the service provider 102 queries the OEM system 106 to determine a fuel tank part number that is associated with the vehicle 100 based on the VIN. Once the fuel tank part number has been identified, the service provider 102 obtains a fuel tank model or mapping 130 for the specific fuel tank part number stored in the database 132. Again, the fuel tank model includes specific fuel level percentage value to fuel volume value mappings that are specific to the fuel tank part number (and specific to the geometries of the fuel tank). The service provider 102 uses the fuel tank model or mapping to convert the fuel level percentage value to a fuel volume value. The fuel volume value can be transmitted in a message to the recipient system 104. The fuel volume value could also be displayed to the vehicle operator through a human machine interface. In an example calculation, the fuel level percentage value calculated by the vehicle controller 110 could include 36.765%, which would be converted to a fuel volume of 5.00 gallons by the service provider 102, as identified in the selected fuel tank model.

Figure 4:
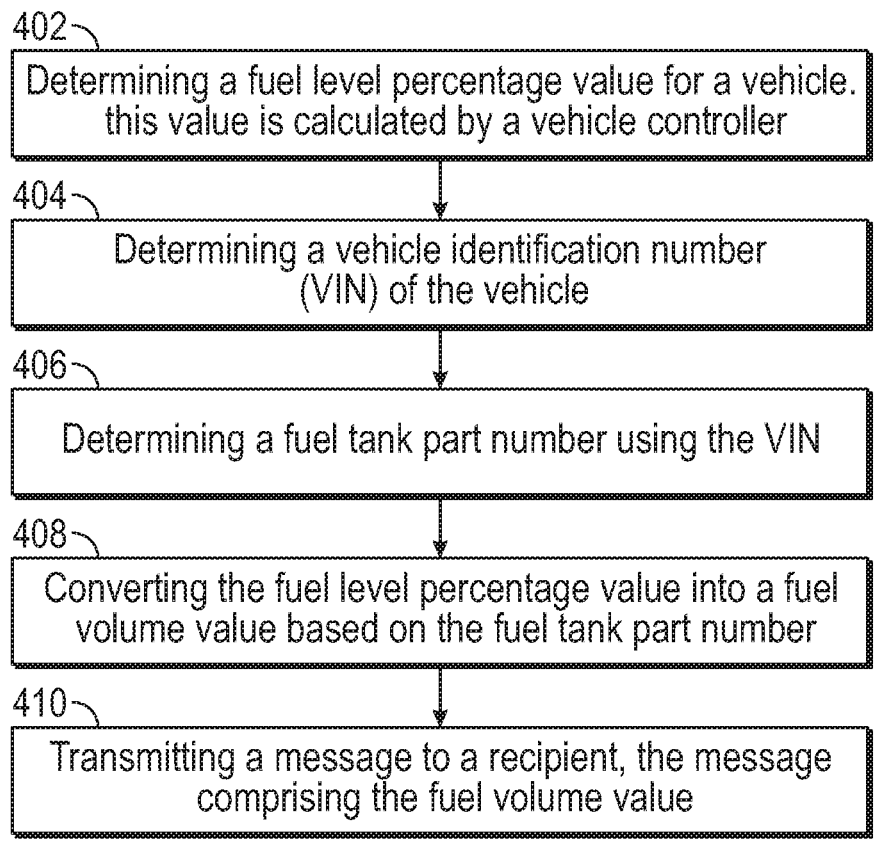
FIG. 4 is a flowchart of an example method of the present disclosure.

FIG. 4 is a flowchart of an example method of the present disclosure. The method includes a step 402 of determining a fuel level percentage value for a vehicle. This value is calculated by a vehicle controller. The fuel level percentage value can be determined from a message transmitted by the vehicle to a service provider. The method includes a step 404 of determining a vehicle identification number (VIN) of the vehicle. The VIN can be transmitted to the service provided by the vehicle controller. The VIN could also be obtained from the recipient system 104.

Next, the method includes a step 406 of determining a fuel tank part number using the VIN. As noted above, this can include interrogating or querying an OEM system for specific vehicle equipment part numbers using the VIN. The method includes a step 408 of converting the fuel level percentage value into a fuel volume value based on the fuel tank part number. In general, this process includes identifying a fuel tank model or mapping from the fuel tank part number and utilizing the fuel tank model or mapping in a lookup process. When the fuel volume value is obtained from the fuel tank model or mapping, the method can include a step 410 of transmitting a message to a recipient, the message comprising the fuel volume value.

For example, the recipient could include a vehicle rental service who desires to obtain a fuel volume calculation of a current or real-time fuel volume of a vehicle. Using the above-described method, the vehicle rental service can obtain current or real-time fuel volume of a vehicle from the service provider, which enables the vehicle rental service to make intelligent determinations about vehicle fuel levels and corresponding charges for vehicle renters.

As noted above, this method can include additional steps such as generating a first mapping table that comprises VIN numbers in association with fuel tank part numbers. The method can also include a step of generating a second mapping table that comprises fuel tank part numbers in association with fuel tank models. Each of the fuel tank models comprises correlations of fuel level percentages and fuel volume values.

Figure 5:
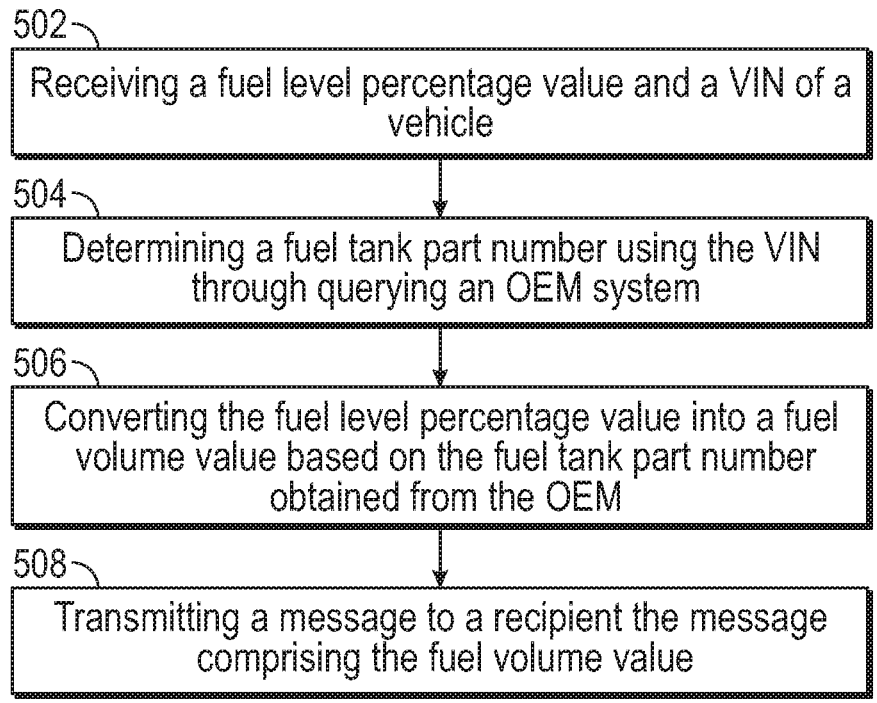
FIG. 5 is a flowchart of an example method of the present disclosure.

FIG. 5 is a flowchart of another example method. The method can include a step 502 of receiving a fuel level percentage value and a VIN of a vehicle. The method can also include a step 504 of determining a fuel tank part number using the VIN through querying an OEM system. The method can further include a step 506 of converting the fuel level percentage value into a fuel volume value based on the fuel tank part number, as well as a step 508 of transmitting a message to a recipient, the message comprising the fuel volume value.

Referring back to FIG. 1, the service provider 102 can comprise fuel estimation assessment logic 134 (e.g., estimation model). The fuel tank model selected for a given vehicle may be assumed to deliver a specific level of accuracy (example 95%) for a single measurement. When multiple measurements are used to calculate a change in fuel volume, then the uncertainty in a single measurement is additive for any difference calculation, e.g. a single measurement accuracy of 95% is squared (90%) for two measurements.

In order to assess the accuracy of fuel volume/percentage estimations, a standard can be established to compare the estimate against. A Fuel Used This Duration (FUTD) standard includes an accumulated fuel consumed during a trip. The Fuel Used This Duration is a reliable standard applied by the vehicle controller 110 through FUTD logic 136. In general, the FUTD logic 136 can be used to generate signal generated by the vehicle controller 110 that is indicative of a fuel used during a single ignition cycle extending between a key-on event and a key-off event. The FUTD can involve an aggregation of telematics control unit fuel flow data that is transmitted at the key-off event of a single ignition cycle. A rolling counter can be implemented having a +/−5% error margin. Some issues that may affect comparative accuracy include, but are not limited to, large fuel consumption values and aggregation of fuel. A comparison-based standard can be used, which may be a criteria-based calculation that provides accuracy and samples that can be used to evaluate fuel tank model performance.

Once the FUTD value is calculated and transmitted to the service provider 102, the fuel estimation assessment logic 134 of the service provider can compare the FUTD to a first fuel volume estimate at a key-on event to a second fuel volume estimate at subsequent key-off event. Using difference calculations, the fuel estimation assessment logic 134 can determine if the fuel tank model used to obtain the first fuel volume estimate and the second fuel volume estimate is performing accurately. To be sure, the fuel estimation assessment logic 134 can reside at the vehicle controller 110 in some instances. Generally, the fuel estimation assessment logic 134 is used to evaluate the accuracy of a fuel tank model, the creation of which is described above.

Figure 6:
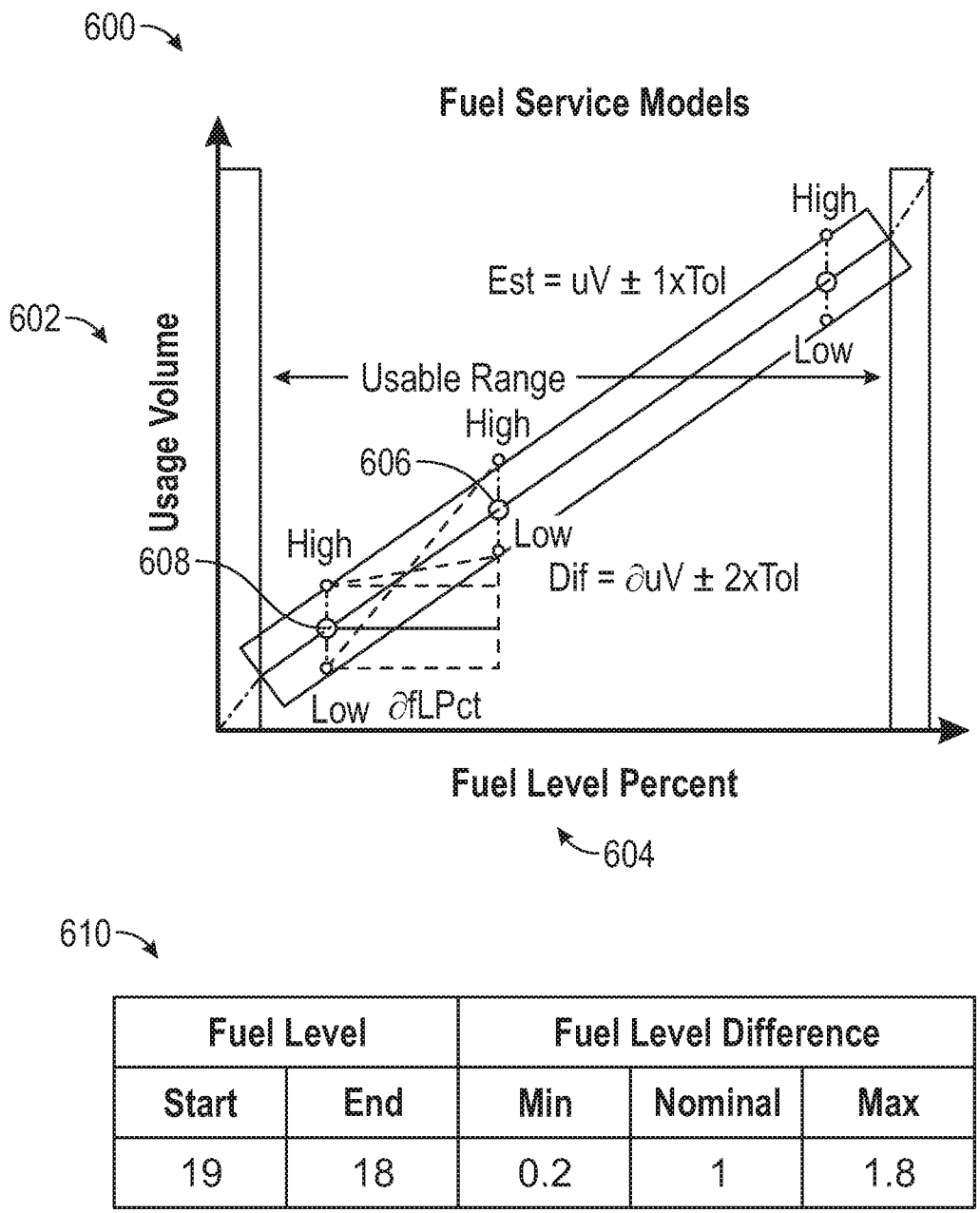
FIG. 6 is a graphical view of a fuel tank model that plots fuel volume values versus fuel level percentage values.

FIG. 6 graphically illustrates an example fuel tank model 600 that plots fuel volume values 602 versus fuel level percentage values 604. The first fuel volume estimate at the key-on event is illustrated as point 606. The second fuel volume estimate at the key-off event is illustrated as point 608. As noted above, measuring between two points may introduce inherent error. When measuring volume differences, the tolerance at each point accumulates over the calculation. In an example table 610, at the first fuel volume estimate, the fuel volume is 19 gallons. At the second fuel volume estimate, the fuel volume is 18 gallons. The fuel level difference could have a calculated minimum of 0.2, a nominal value of 1, and a maximum of 1.8. This example assumes a +/−0.4 gallon tolerance for a single measurement.

The model performance measurement performed by the fuel estimation assessment logic 134 can obtain a fuel consumed/FUTD value which is used as a master gauge and is represented as (∂uV). The fuel estimation assessment logic 134 can be used to calculate a fuel tank model prediction of fuel levels a key-on event and at a key-off event (uV). The fuel estimation assessment logic 134 can be used to compare fuel tank model prediction to fuel consumed (∂uV−uV). If the difference is within an expected tolerance level or range, the fuel tank model is considered to be accurate.

The fuel estimation assessment logic 134 can utilize an estimation model that provides a usable fuel volume estimate from fuel volume readings that is based on experimental data. The estimation model can be define as:

$$Est = uV \pm 1 \times Tol$$

where an estimation Est is equal to fuel levels a key-on event and at a key-off event (uV) having a tolerance (Tol) or accuracy $(1-\alpha)=0.95$ where a significance level $\alpha$ is 0.05.

Alternatively, the fuel estimation assessment logic 134 can utilize a comparative calculation that compares an estimated change in fuel volume over a trip with an observed fuel consumption/FUTD based on connected vehicle data. The comparative model can include:

$$Diff = \partial uV \pm 2 \times Tol$$

where the difference calculation (Diff) is equal to the master gauge value ∂uV which has a specific tolerance. A tolerance for this difference model can be a doubling of an estimation tolerance noted above. An accuracy is equal to $(1-\alpha)^2 = 0.95^2 = 0.903$, where a significance level $\alpha$ is 0.05. The comparative model also identifies or calculates a change in fuel level/volume percentage ∂fLPCT between the points 608 and 606. That is, the fuel estimation assessment logic 134 can be used to calculate a fuel level percentage estimate at point 608 and a fuel level percentage estimate at point 606. The change in these fuel level percentage estimates can then be compared to the observed fuel consumption/FUTD based on connected vehicle data. As noted above, the comparative calculation used by the fuel estimation assessment logic 134 can be used to compare fuel tank model prediction at two points in time (key-on/key-off events) to empirical fuel consumed values (∂uV−uV).

Figure 7:
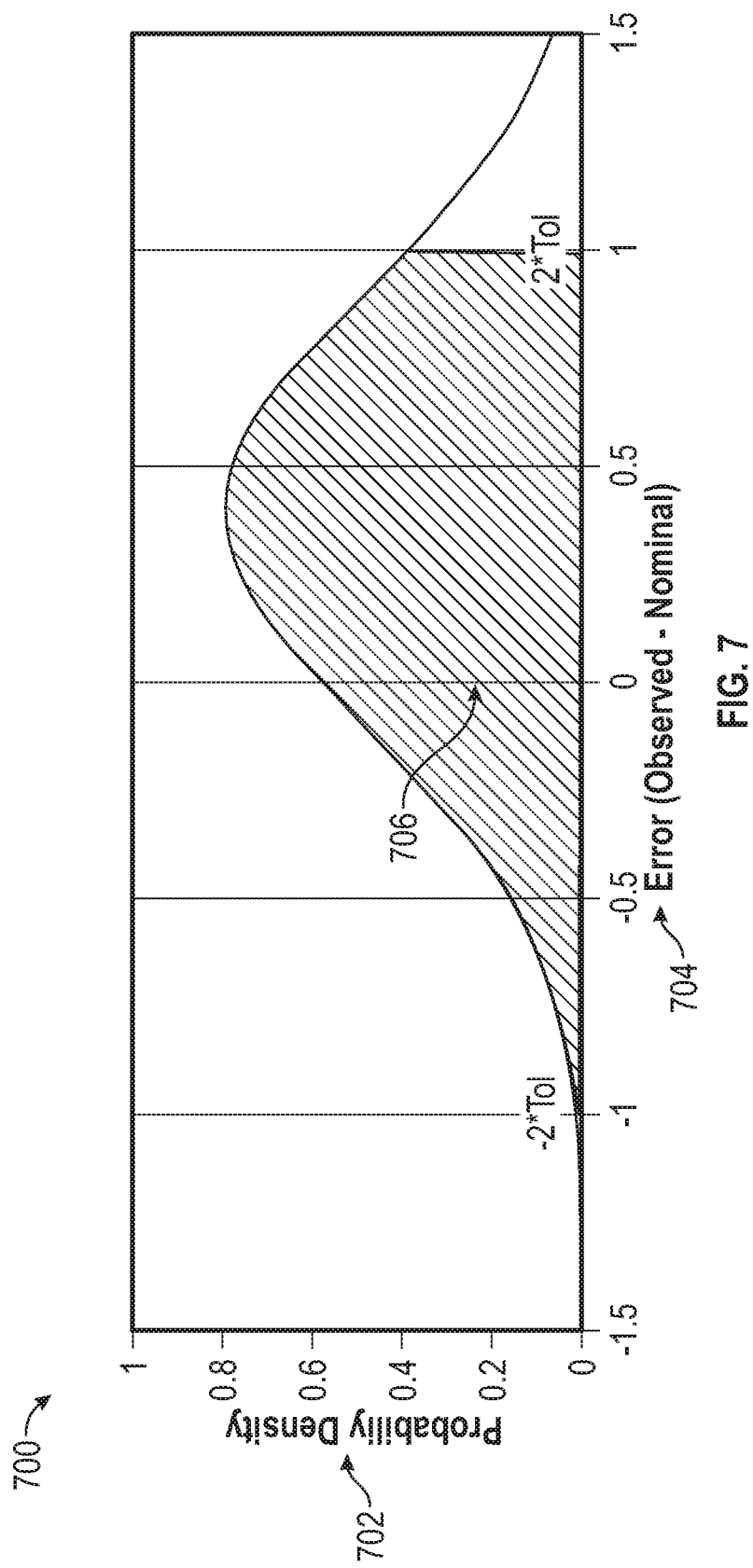
FIG. 7 is a graphical view of a plurality of different calculations for various vehicles.

Generally, the comparative methodology allows for comparison of a fuel difference prediction (fuel model at two points in time), in view of an associated tolerance, compared with a master gauge of fuel consumed (e.g., FUTD). Difference calculations can be separated into any of three accuracy categories which include accurate, monitor, and investigate. If a difference calculation is accurate, it means that the fuel tank model is performing as expected. A difference calculation of monitor indicates that a fuel tank model might not be performing as expected. An investigate status indicates that the fuel tank model is not performing as expected. FIG. 7 is a graph 700 that illustrates a distribution between observed and nominal data (e.g., fuel used during a duration, such as between a key-on and subsequent key-off event). The graph 700 plots observed data using probability density data on a first axis 702 versus an error calculation (e.g., observed minus nominal) on a second axis 704. The error tolerance may be assumed to be 0.5 gallons, as an example. The observed data 706 is represented as correlated data that exists as an "area under the curve". In one example use case, if observed data in the area under the curve are greater than or equal to an accuracy threshold the model is considered to be accurate. When the observed data in the area under the curve is less than an accuracy threshold the model and/or is greater than or equal to a monitor threshold, the model may be flagged for monitoring or further review. If the observed data in the area under the curve falls elsewhere (below the monitoring threshold), the model is identified for investigation. In the example provided, the accuracy threshold could be 0.95, and the monitor threshold could be 0.68, but other values can be used.

In another example use case the expected minimum value is 0.2 gallons and the expected maximum is 1.8 gallons, values falling therein would be considered to indicate an accurate fuel tank model. The monitor category can be used when the difference calculation falls marginally outside the minimum and/or maximum values described above. If the expected minimum value is 0.2 gallons and the expected maximum is 1.8 gallons, values falling outside such as 0.10-0.19 or 1.81-2.0 might be to indicate that the fuel tank model should be monitored. The investigate category can be used when the difference calculation falls further outside the minimum and/or maximum values described above. If the minimum value is 0.2 gallons and the maximum is 1.8 gallons, values falling outside such as below 0.1 or above 3 might indicate an inaccurate fuel tank model. The thresholds established for accuracy calculations of fuel tank models may vary in composition as desired by end users or vehicle manufacturers.

Referring back to FIG. 1, when the accuracy level for the fuel tank model falls into the investigate category, the service provider 102 can be configured to obtain vehicle operating parameters during the trip for evaluation. For example, the service provider 102 can set vehicle operating parameters from the vehicle controller 110 that were collected during a trip timeframe (e.g., between key-on and key-off events). These vehicle operating parameters can include data such as ambient temperature, acceleration data, and so forth. To be sure, these various vehicle operating parameters may affect the fuel volume estimates. Thus, even an accurate fuel tank model may produce differing results based on varying vehicle operating parameters or ambient conditions. Also, it could be that the fuel tank model is itself deficient or underperforming. In these instances, the fuel tank model can be recomputed using the known volume and fuel level percentage correlation process described above.

Figure 8:
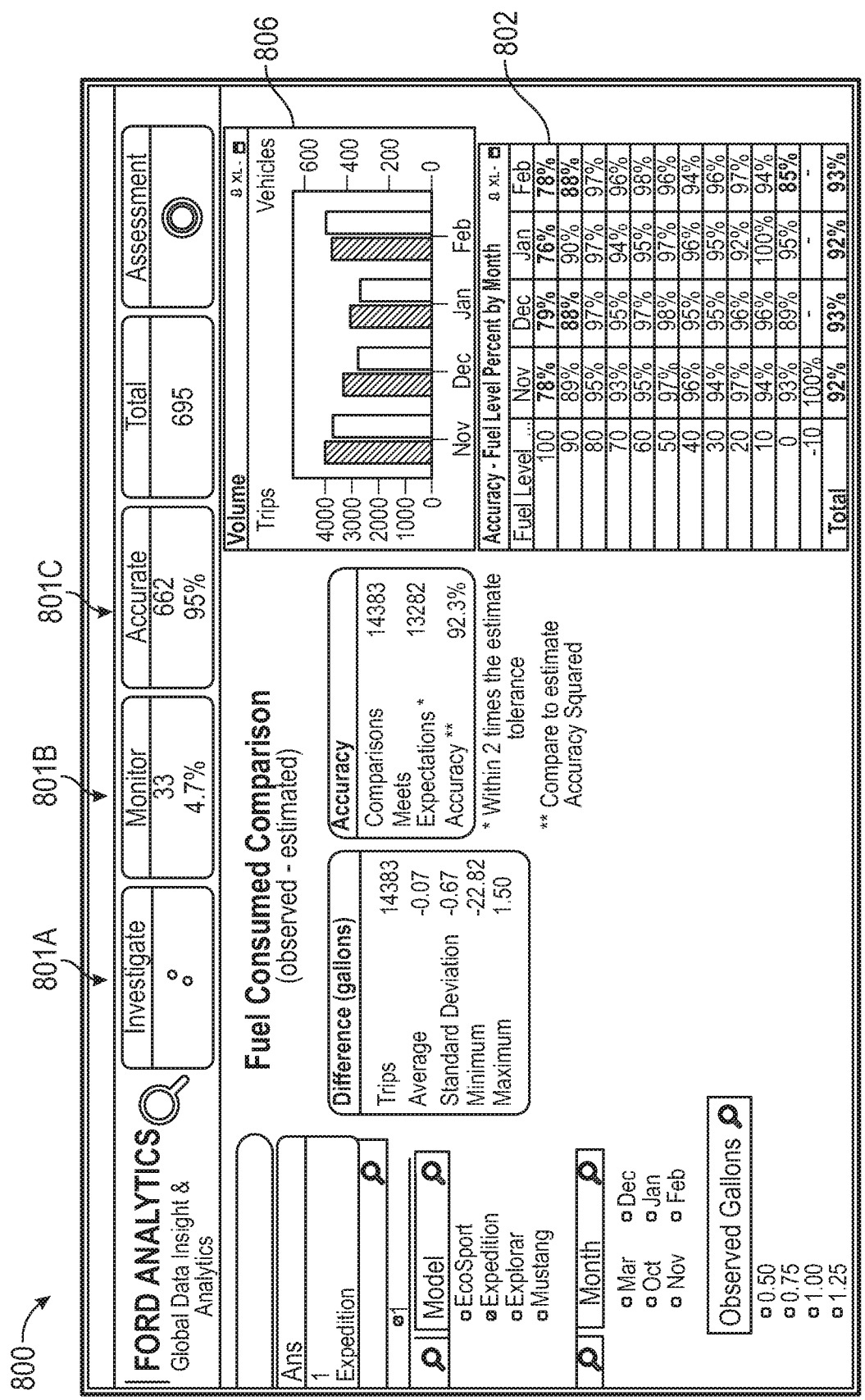
FIG. 8 is a graphical representation of a dashboard.
Figure 8:
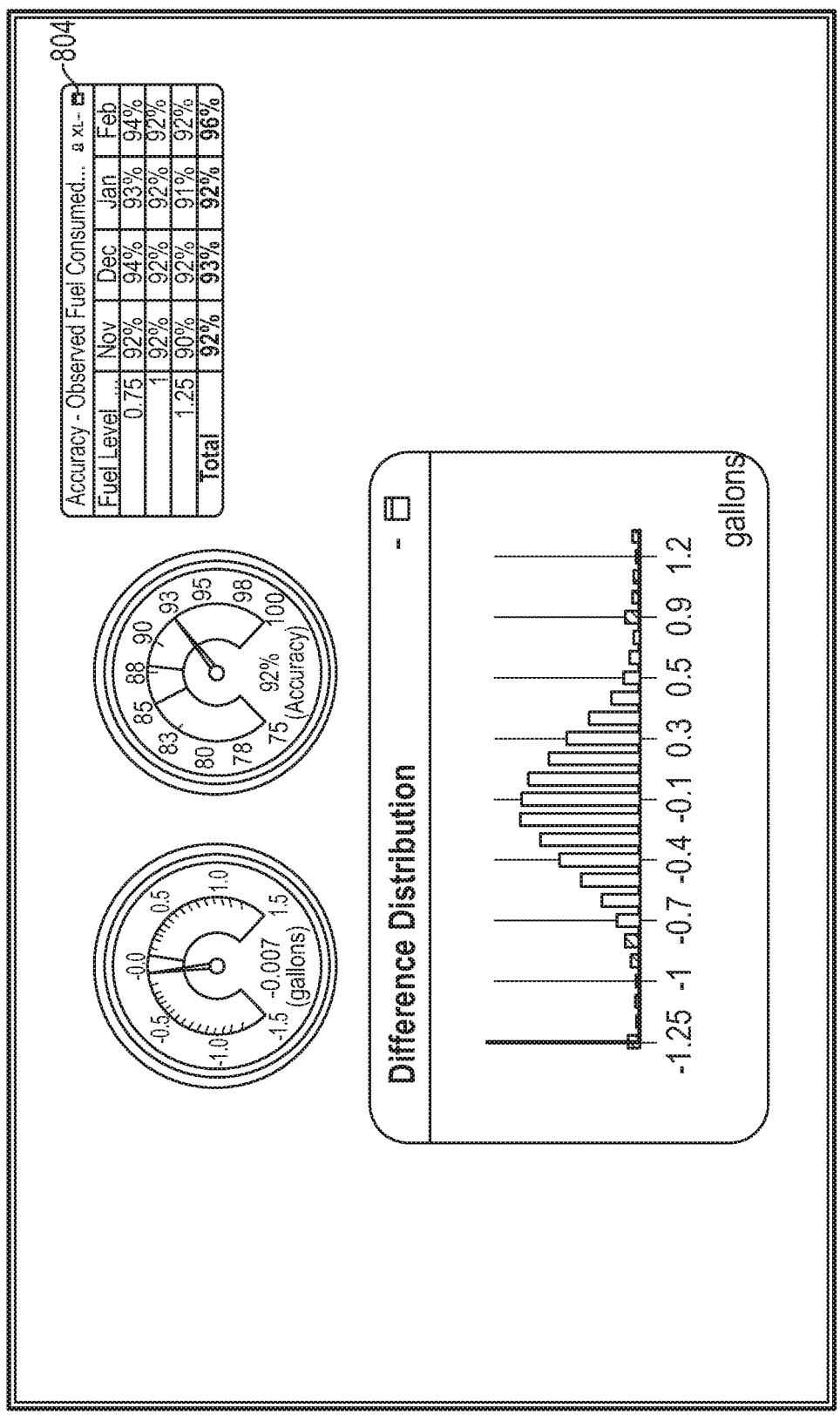

FIG. 8 is another graphical representation in the form of a dashboard 800 that provides indications of vehicles in accurate, monitor, and investigate categories 801A-801C. The dashboard 800 allows users to visualize results with specific metrics to identify how fuel volume estimation models were performing. The dashboard 800 identifies how many vehicles fall within the different assessment categories, the overall accuracy of the fuel volume estimation model, and the accuracy over different areas of the fuel tank across time. This information can help identify areas to investigate if the performance accuracy is not meeting expected thresholds.

For example, zero vehicles are in the investigate category, while 33 are in the monitor category, and 662 are in the accurate category. The dashboard 800 can include fuel level percent by month panel 802 (represents accuracy across different areas of the fuel tank across a period of time), an observed fuel consumed panel 804, a fuel volume panel 806. The dashboard 800 can also include an overall accuracy gauge which indicates collectively how the fuel tank models are performing. The dashboard 800 can also provide information regarding the vehicles tested, by model, as well as difference calculation parameters (such as trip numbers, averages, standard deviations, minimum, and maximum values).

Figure 9:
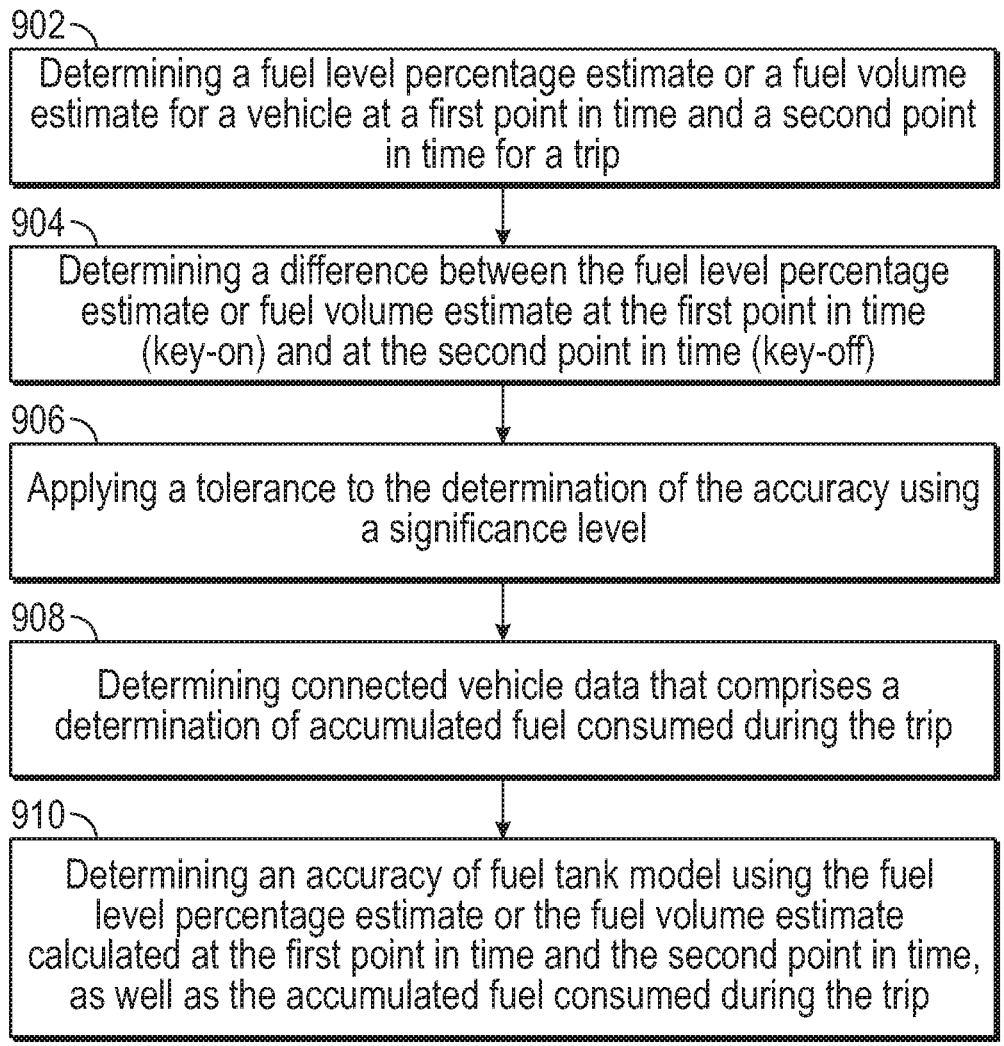
FIG. 9 is a flowchart of an example method of the present disclosure.

FIG. 9 is a flowchart of a method of the present disclosure. The method includes a step 902 of determining a fuel level percentage estimate or a fuel volume estimate for a vehicle at a first point in time and a second point in time for a trip. The fuel level percentage estimate or the fuel volume estimate being determined using a fuel tank model of a fuel tank of a vehicle. The method can include a step 904 of determining a difference between the fuel level percentage estimate or fuel volume estimate at the first point in time and at the second point in time. For example, a fuel volume at the first point in time could be 18 gallons and the fuel volume at the second point in time could be 16 gallons, for a difference of two gallons.

The method can include a step 906 of applying a tolerance to the determination of the accuracy using a significance level. As noted above, the tolerance can be used to calculate minimum and maximum values for the fuel level percentage estimate or fuel volume estimate that creates upper and lower expected boundary values.

The method can include a step 908 of determining connected vehicle data that comprises a determination of accumulated fuel consumed during the trip. This is referred to above as a FUTD value. The method then includes a step 910 of determining an accuracy of fuel tank model using the fuel level percentage estimate or the fuel volume estimate calculated at the first point in time and the second point in time, as well as the accumulated fuel consumed during the trip. As noted above, the accuracy can be determined by using the difference between the fuel level percentage estimate or fuel volume estimate at the first point in time and at the second point in time as calculated in step 904 minus the FUTD value. The accuracy value is compared to various thresholds to determine if the fuel tank model is accurate, whether the fuel tank model should be monitored, or whether the fuel tank model is inaccurate.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   determining a fuel level percentage estimate or a fuel volume estimate for a vehicle at a first point in time and a second point in time for a trip, the fuel level percentage estimate or the fuel volume estimate being determined using a fuel tank model of a fuel tank of a vehicle;
   determining connected vehicle data that comprises a determination of accumulated fuel consumed during the trip; and
   determining an accuracy of a fuel tank model using the fuel level percentage estimate or the fuel volume estimate calculated at the first point in time and the second point in time, as well as the accumulated fuel consumed during the trip.

2. The method according to claim 1, further comprising applying a tolerance to the determination of the accuracy using a significance level.

3. The method according to claim 1, wherein the first point in time is associated with a key-on event for the vehicle and the second point in time is associated with a key-off event for the vehicle.

4. The method according to claim 1, further comprising determining an accuracy category for the accuracy of the fuel tank model selected from accurate, monitor, and investigate.

5. The method according to claim 1, further comprising plotting the accuracy on a graph of a dashboard along with accuracy determinations for a plurality of other vehicles.

6. The method according to claim 1, further comprising:
   determining a fuel level percentage estimate for the vehicle;
   determining a vehicle identification number (VIN) of the vehicle;
   determining a fuel tank part number using the VIN; and
   converting the fuel level percentage estimate into the fuel volume estimate based on the fuel tank part number.

7. The method according to claim 6, wherein converting the fuel level percentage estimate into the fuel volume estimate comprises utilizing a first mapping table that comprises VIN numbers in association with fuel tank part numbers.

8. The method according to claim 7, further comprising utilizing a second mapping table that comprises fuel tank part numbers in association with fuel tank models, wherein each of the fuel tank models comprise correlations of fuel level percentage values and fuel volume values.

9. A system, comprising:
   a processor; and
   a memory for storing instructions, the processor executing the instructions to:
      determining a fuel level percentage estimate or a fuel volume estimate for a vehicle at a first point in time and a second point in time for a trip, the fuel level percentage estimate or the fuel volume estimate being determined using a fuel tank model of a fuel tank of a vehicle;

receive connected vehicle data from the vehicle, the connected vehicle data comprises a determination of accumulated fuel consumed during the trip; and determining an accuracy of a fuel tank model using the fuel level percentage estimate or the fuel volume estimate calculated at the first point in time and the second point in time, as well as the accumulated fuel consumed during the trip.

10. The system according to claim 9, wherein the processor is configured to apply a tolerance to the determination of the accuracy using a significance level.

11. The system according to claim 9, wherein the first point in time is associated with a key-on event for the vehicle and the second point in time is associated with a key-off event for the vehicle.

12. The system according to claim 9, wherein the processor is configured to determine an accuracy category for the accuracy of the fuel tank model selected from accurate, monitor, and investigate.

13. The system according to claim 9, wherein the processor is configured to:
determining a fuel level percentage estimate for the vehicle;
determining a vehicle identification number (VIN) of the vehicle;
determining a fuel tank part number using the VIN; and
converting the fuel level percentage estimate into the fuel volume estimate based on the fuel tank part number.

14. The system according to claim 9, wherein the processor converts the fuel level percentage estimate into the fuel volume estimate comprises utilizing a first mapping table that comprises VIN numbers in association with fuel tank part numbers.

15. The system according to claim 14, wherein the processor is configured to utilize a second mapping table that comprises fuel tank part numbers in association with fuel tank models, wherein each of the fuel tank models comprise correlations of fuel level percentage values and fuel volume values.

16. A system, comprising:
a connected vehicle that transmits connected vehicle data that comprises a determination of accumulated fuel consumed during a trip of a vehicle;
a service provider that is configured to:
determine a fuel level percentage estimate or a fuel volume estimate for a vehicle at a first point in time and a second point in time for a trip, the fuel level percentage estimate or the fuel volume estimate being determined using a fuel tank model of a fuel tank of a vehicle; and
determining an accuracy of a fuel tank model using the fuel level percentage estimate or the fuel volume estimate calculated at the first point in time and the second point in time, as well as the accumulated fuel consumed during the trip.

17. The system according to claim 16, wherein the service provider applies a tolerance to the determination of the accuracy using a significance level.

18. The system according to claim 17, wherein the first point in time is associated with a key-on event for the vehicle and the second point in time is associated with a key-off event for the vehicle.

19. The system according to claim 18, wherein the service provider determines an accuracy category for the accuracy of the fuel tank model selected from accurate, monitor, and investigate.

20. The system according to claim 19, wherein the service provider identifies the accuracy category as being investigate, the service provider determines vehicle operating parameters during the trip for evaluation.

* * * * *